United States Patent
Beer

[11] Patent Number: 5,287,764
[45] Date of Patent: Feb. 22, 1994

[54] DEVICE FOR ACTUATING A HYDRAULIC POWER STEERING SYSTEM

[75] Inventor: Wilhelm Beer, Russelsheim, Fed. Rep. of Germany

[73] Assignee: Alfred Teves GmbH, Frankfurt am Main, Fed. Rep. of Germany

[21] Appl. No.: 910,259

[22] PCT Filed: Jun. 6, 1991

[86] PCT No.: PCT/EP91/01039
§ 371 Date: Sep. 14, 1992
§ 102(e) Date: Sep. 14, 1992

[87] PCT Pub. No.: WO92/08637
PCT Pub. Date: May 29, 1992

[30] Foreign Application Priority Data
Nov. 17, 1990 [DE] Fed. Rep. of Germany ....... 4036743

[51] Int. Cl.⁵ .............................................. B62D 5/06
[52] U.S. Cl. ....................... 74/498; 74/422; 180/147
[58] Field of Search ................ 74/422, 494, 496, 498; 180/147, 148

[56] References Cited
FOREIGN PATENT DOCUMENTS
291155 11/1988 European Pat. Off. .
2225961 11/1974 France .
1146181 3/1969 United Kingdom .

Primary Examiner—Leslie A. Braun
Assistant Examiner—William O. Trousdell
Attorney, Agent, or Firm—Robert P. Seitter; J. Gordon Lewis

[57] ABSTRACT

Apparatus for actuating a hydraulic power steering system for automotive vehicles, wherein the steering shaft (1) is allowed to roll off on the gear rack (3) to a small degree to actuate the steering valve. To enable this rolling motion, the steering shaft (1) is supported in a sleeve (9) which, in turn, is supported through needle bearings (10) so as to be rotatable in relation to the steering gear housing (4). To prevent inadvertent steering maneuvers in the event of partial or complete system failure, the needle bearing axis is arranged in parallel to the center line of the steering shaft (1) as well as in one plane with the steering shaft and with the point of force transmission between pinion (2) and gear rack (3). The needle bearing axis is radially outward from the central point of the steering shaft axis than the point of force transmission. A captivated spring (24) is provided to retain the valve slide (19) in its neutral position.

24 Claims, 3 Drawing Sheets

DEVICE FOR ACTUATING A HYDRAULIC POWER STEERING SYSTEM

BACKGROUND OF THE INVENTION

The present invention relates to a device for actuating a hydraulic power steering system for automotive vehicles having the following features:

A steering shaft, non-rotatably coupled with the steering wheel, is furnished with a pinion and is supported in a sleeve, The pinion is engaged with a gear rack coupled to the wheels to be steered, The sleeve is supported in a steering gear housing so as to be pivotable about an axis, parallel in relation to the steering shaft, and it comprises a recess to enable the pinion to engage into the gear rack, and on it a pin-shaped extension is secured perpendicularly relative to the steering shaft, the extension actuating the valve slide of a steering valve designed as a linear slide valve, and A spring which presses the gear rack against the pinion and simultaneously stabilizes the support of the sleeve in the steering gear housing.

A device of this type is known from European patent application 0 291 155. In this prior art device, the sleeve is supported on that side of the steering shaft in the housing which is remote from the gear rack. The bearing is formed by a spherical indentation in the extension and a spherical shell-shaped recess in the steering gear housing. A disadvantage of this device is that high friction forces occur in the bearing because of the great radius of effect the friction force has due to the spring being pressed on. However, the strong spring is required to ensure freedom of play between gear rack and pinion. Further, the system has a tendency of being unstable since the force of the spring, which keeps the gear rack in contact with the pinion, induces a rolling motion of the steering shaft on the gear rack, the steering valve being actuated as a result. This might be a safety risk since the vehicle would be steered inadvertently in such a case.

SUMMARY OF THE INVENTION

Therefore, it is an object of the present invention to improve upon the known steering actuating device such as to render it stable in the neutral position and to nevertheless permit its actuation almost without losses due to friction. In addition, the inventive device is to have a degree of freedom of rotation solely in parallel to the steering shaft axis.

This object is achieved by the combination of the following features with the known features:

The bearing between the sleeve and the steering gear housing is formed by two needles, The two needle bearings are disposed on different sides of the gear rack, and The bearing axis of the two needle bearings is farther away from the steering shaft center line than the point of force transmission between pinion and gear rack, and it is placed on the same side of the steering shaft center line as the latter point, and the valve slide is biassed by a captivated spring.

The design and arrangement of the needle bearings has, as a result, a small radius of effect of the friction forces which are caused due to the load on the spring, and thus permits an easy-motion actuation. The captivated spring stabilizes the valve slide in its neutral position.

In an advantageous improvement of the present invention, each of the needles is retained in an insert ring rigidly coupled to the steering gear housing. This measure permits an easy assembly of the insert rings with the needles in the steering gear housing. The second bearing part in the sleeve is formed in a straightforward fashion by annular extensions of the sleeve, fixed in relation to the needles by the force of a spring. In addition, the insert rings simultaneously serve as limiters (stops) for the rotary motion of the sleeve about the bearing axis. This results in reliable prevention of large roll off motions of the steering shaft and sleeve on the gear rack which might cause damage to the steering valve, the steering gear housing or the teeth of the gear rack.

A particularly simple assembly is made possible by a radial extension being screwed into a threaded bore of the sleeve. In this embodiment, the extension can be screwed in after the sleeve and steering shaft have been inserted into the gear housing.

In order to adjust a maximum possible valve travel in the event of slight roll-off motions of the sleeve and steering shaft, expediently, the radial extension is arranged perpendicular relative to the gear rack.

Other embodiments of this invention provide that the end of the radial extension which is not coupled to the sleeve is furnished with a spherical joint and is received in a recess of the valve slide. Also, the housing of the steering valve is rigidly coupled to the steering gear housing.

Apart from actuation of a steering valve, the inventive device can be used also to re-adjust the eccentricity of a pump which directly acts upon a double-effect hydraulic cylinder producing the auxiliary force, or to actuate an electric switch, a sliding contact, a potentiometer or sensor of an electric or electrohydraulic power-assisted steering system, respectively.

The present invention will be explained hereinbelow by way of an embodiment with reference to the accompanying drawings.

DETAILED DESCRIPTION OF THE INVENTION

Figure 1:
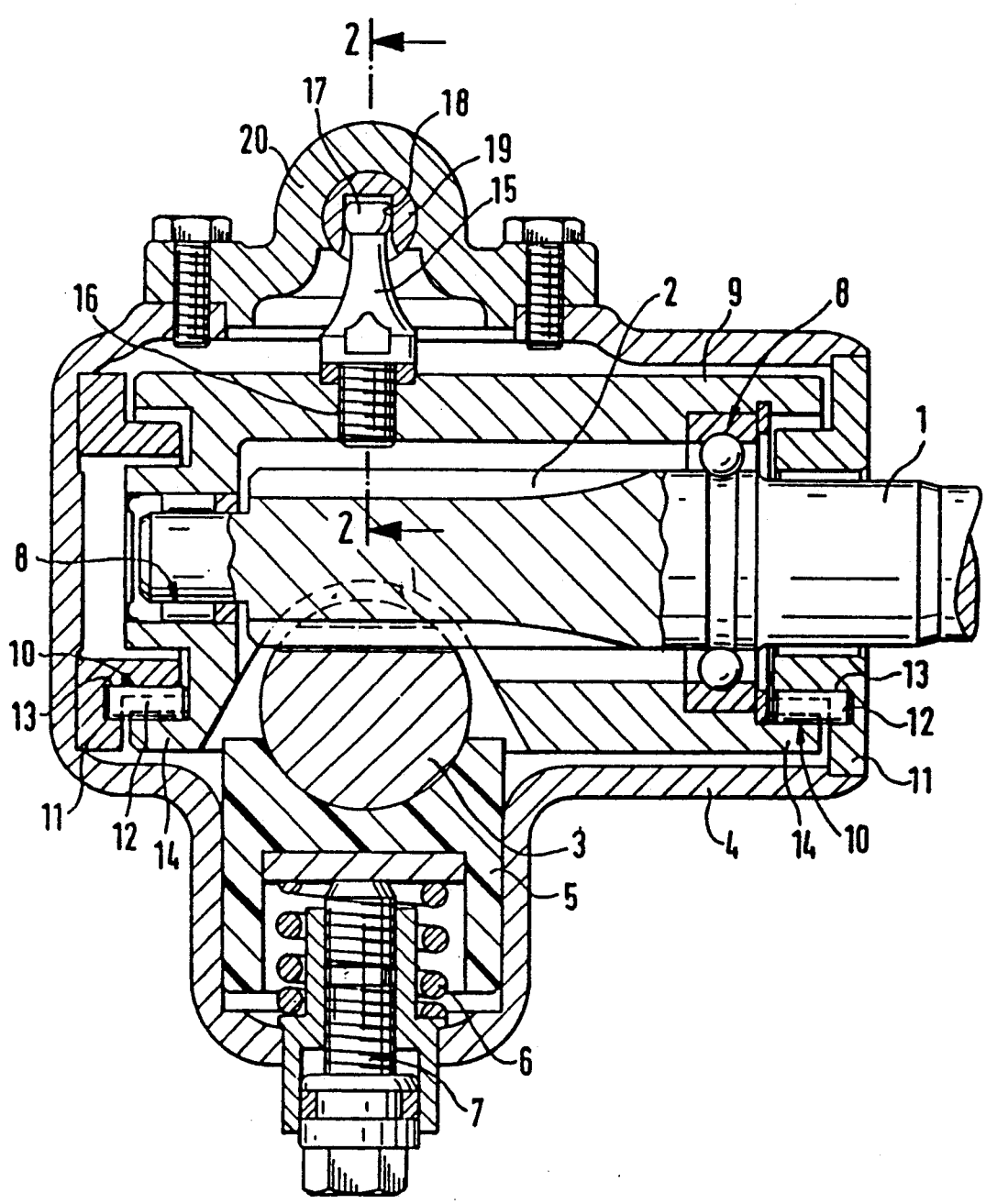
FIG. 1 is a cross-section taken through the steering gear housing in parallel to the steering shaft.

Like parts have been assigned like reference numerals in all Figures. All Figures will be described jointly.

The steering shaft 1, which is non-rotatably coupled to a steering wheel (not shown), can be seen in the drawing. The steering shaft 1 is provided with an integral pinion 2 in the embodiment shown. The pinion 2 is engaged with the gear rack 3 which extends perpendicular to the drawing plane and is coupled at its ends with the guide rods of the wheels to be steered (not shown). Steering shaft 1 and gear rack 3 are arranged in a common steering gear housing 4. Through the spring 6 and the retaining element 7, the gear rack 3 is supported in the thrust member 5 in relation to the steering gear housing 4.

The steering shaft 1 is rotatably supported in a sleeve 9 by way of two roller bearings 8. In turn, the sleeve 9 is pivotally supported in the steering gear housing 4 by two needle bearings 10 and two insert rings 11 which are rigidly coupled to the steering gear housing 4. The needles 12 of the needle bearings 10 are retained in bores 13 of the insert rings 11. By an annular extension 14, the sleeve 9 takes, in each case, support on each needle 12 and is fixed in its position by the force of the spring 6. It is essential that the axis of the needle bearings 10, the center line of the steering shaft 1 and the point of force transmission from the pinion 2 to the gear rack 3 lie in one plane, and that the needle bearing axis is more remote from the steering shaft 1 than this point of force transmission, while both are disposed on the same side of the steering shaft 1.

A radial extension 15 is screwed into a threaded bore 16 of the sleeve 9 on the side of the sleeve 9 opposite from the gear rack. This extension 15 is arranged perpendicular to the steering shaft 1 and perpendicular to the gear rack 3. The other end of the extension 15 is designed as a spherical head 17 and is received in a recess 18 of the valve slide 19 of the steering valve which is designed as a linear slide valve. The housing 20 of the steering valve is attached to the steering gear housing 4. The valve slide 19 extends parallel to the gear rack 3.

Figure 2:
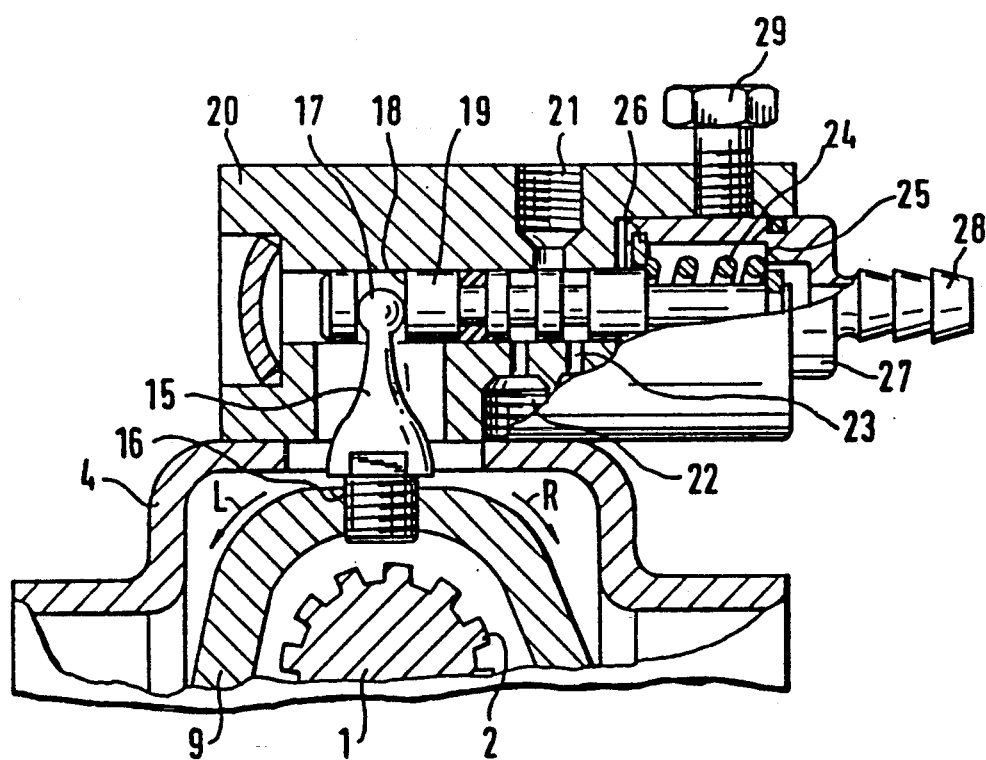
FIG. 2 is a cross-section taken through steering gear housing and valve housing in parallel to the gear rack.

FIG. 2 shows the cross-section taken along line 2—2 in FIG. 1. The valve housing 20 has a port 21 which connects to a hydraulic pump, a port 22 which is pressurized on steering to the right, and a port 23 which is pressurized on steering to the left. All three ports 21, 22, 23 are interconnected in the neutral position which is illustrated. The direction in which the sleeve 9 rotates with the steering shaft 1 during steering is indicated by small arrows and the letters R and L.

The captivated spring 24 on the valve slide 19 can be seen on the right-hand side in the housing 20. It is captivated between the stops 25 and 26 and will come into abutment on the insert 27 on the housing when the slide 19 displaces. In addition, the spring 24 exhibits a highly progressive characteristic curve. The insert 27 comprises a port 28 which serves as a return port. The valve housing 20 can be completely preassembled. By means of the screw 29, the insert 27 can be fixed in relation to the housing 20 after adjustment of the valve slide 19 with the captivated spring 24. The attachment of the valve housing 20 on the steering gear housing 4 takes place when both the valve slide 19 and the steering shaft 1 with the sleeve 9 are in their mid-position.

The operation of the inventive device will now be described. To begin with, the steering movement is introduced into the gear rack 3 via the steering shaft 1 and the pinion 2. However, since the gear rack 3 is coupled to the wheels and the wheels initially stick to their direction because of their friction contact on the road surface, the gear rack 3, too, remains stationary. The steering shaft 1 which, through the sleeve 9, is supported pivotally in relation to the steering gear housing 4 rolls off on the gear rack 3 under these circumstances. In doing so, it entrains the sleeve 9, which, in turn, entrains the extension 15. Depending on the direction of rotation of the steering motion which is introduced, the spherical head 17, coupled to the valve slide 19, will thus move forward or rearward—into or out of the drawing plane—and thus controls the fluid flow in the valve which causes the auxiliary force. The rotary motion of the sleeve 9 is restricted since it will abut on the insert rings 11 after a rotation of a few degrees. As soon as the possibility of tilting about the needle bearings 10 has ended and the auxiliary force acts, the steering shaft 1 rotates exclusively in the slide bearings or, respectively, roller bearings 8 and displaces the gear rack 3. When the auxiliary force fails, a small clearance must be overcome solely at the beginning of the steering maneuver. Normal steering—without boosting—is possible subsequently.

Another advantage of the present invention is that the auxiliary force is controlled in response to the steering resistance. For instance, at high speed, when the wheels offer only little resistance to the steering movement, the steering shaft 1 will not roll off the gear rack 3. This is assisted, in addition, by the captivated spring 24. The steering shaft 1 rotates only in the sleeve 9, and a steering maneuver is performed which is not power-assisted. This also applies on slippery ground, e.g. on ice or snow.

Figure 3:
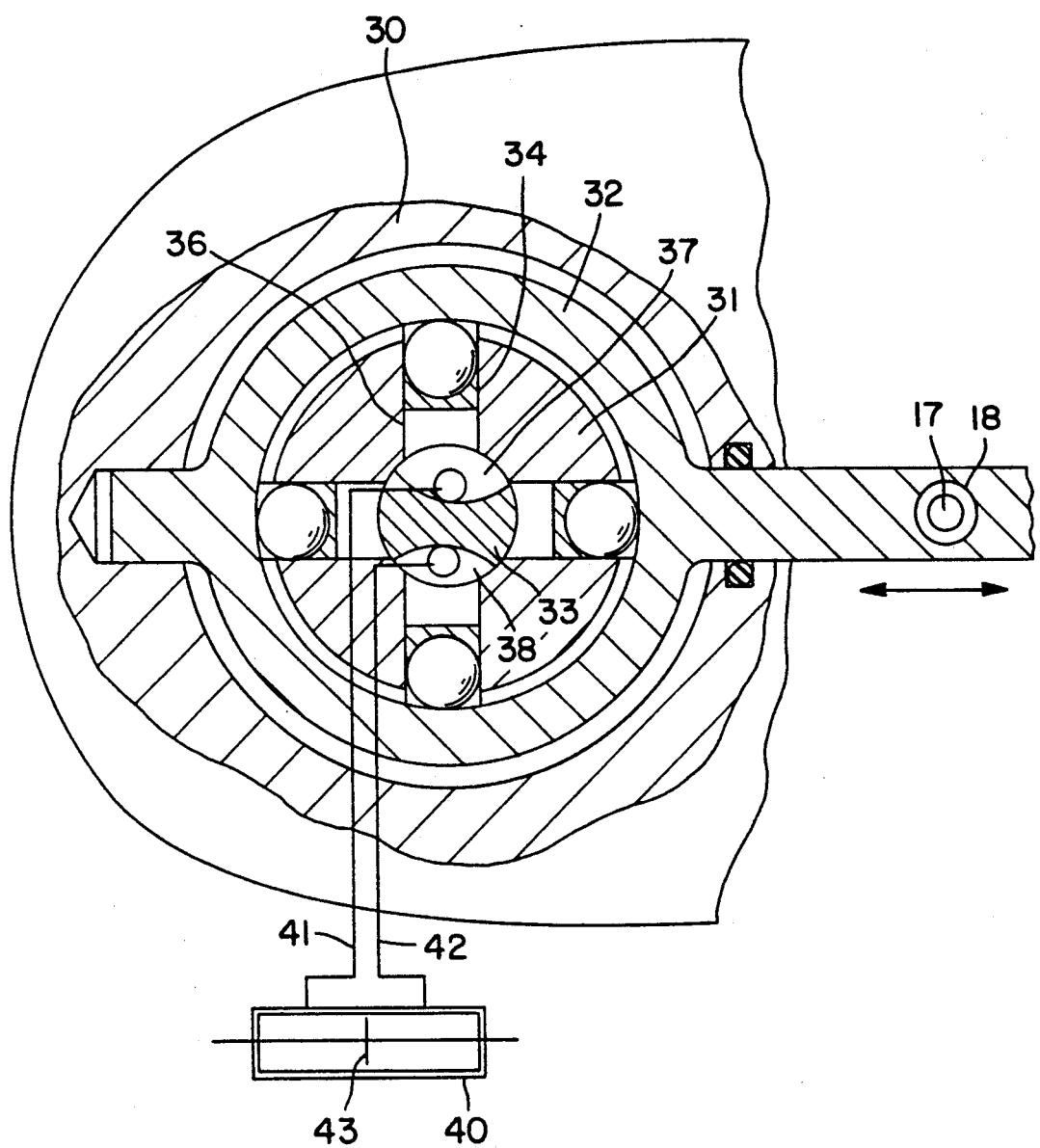
FIG. 3 is a cross-section of a pump which can be used in the present invention to provide fluid pressure.

Referring to FIG. 3, which is a cross-section of a pump which can be used in the power steering system of the present invention to provide fluid under pressure, the housing 30 is stationary in that it is rigidly attached to the steering gear housing 4 of FIG. 1, while the rotor 31 is rotatably supported on a control shaft 33 which, in turn, is fixed to the housing 30. Pistons 34 are guided in bores 36 in the rotor 31 and take support on the inside surface of the external ring 32 via balls 35.

The control shaft 33 is provided with control grooves 37, 38 which are in communication with pressure lines 41, 42 which, in turn, are connected with the chambers of a hydraulic cylinder 40 of the steering system. Pressure fluid is contained in the pressure lines in the pump and the hydraulic cylinder. The external ring 32 can be moved to the left and to the right, respectively. A recess 18 is provided for this purpose into which the spherical head 17 of the extension 15 of FIGS. 1 and 2 is fitted, thereby varying the eccentricity of the pump. The eccentricity is zero in FIG. 3, since rotor 31 and external ring 32 are arranged concentrically. In this position, there is no radial movement of the piston 34 while the rotor 31 is rotating, and the pump does not deliver fluid.

Once the external ring 32 is displaced so that the eccentricity is no longer zero, the pistons 34 in the rotating rotor 31 undergo radial movement and hence deliver pressure fluid from pressure line 41 into pressure line 42 in respect of the one direction of displacement of the external ring 32 and vice-versa in respect of the other direction. This means that in the event of a given direction of rotation and a given rotational speed of the rotor 31, the piston 43 in the double-acting hydraulic cylinder 40 can be readjusted to assume any position desired by varying the eccentricity, namely the position of external ring 32.

An electric switch (or sliding contact or potentiometer or sensor) can be included in the power steering system of the present invention to control the supply of pressure fluid such that pressure fluid is available only when the linear slide control valve is displaced from its inactive position, namely when pressure fluid is required. This can be effected by switching on/off a pump via an electric switch or via the adjustment of the rotational speed of a pump (e.g. via a potentiometer). The pump operation can be controlled by movement of the linear slide control valve or the valve control means, namely extension 15. By disconnecting the source of pressure fluid when no pressure fluid is needed, energy is conserved.

List of Reference Numerals

1—steering shaft
2—pinion
3—gear rack
4—steering gear housing
5—thrust member
6—spring
7—retaining element
8—roller bearing
9—sleeve
10—needle bearing
11—insert ring
12—needle
13—bore
14—annular extension
15—extension
16—threaded bore
17—spherical head
18—recess
19—valve slide
20—valve housing
21—port
22—port
23—port
24—captivated spring
25—stop
26—stop
27—insert
28—port
29—screw
30—housing
31—rotor
32—external ring
33—control shaft
34—pistons
35—balls
36—bores
37—control groove
38—control groove
40—hydraulic cylinder
41—pressure line
42—pressure line
43—piston

I claim:

1. A device for actuating a hydraulic power steering system for automotive vehicles inhering the following features:
   a steering shaft non-rotatably coupled with a steering wheel is furnished with a pinion and is supported in a sleeve,
   the pinion is engaged with a gear rack coupled to wheels to be steered,
   the sleeve is supported in a steering gear housing so as to be pivotable about a parallel axis in relation to the steering shaft, and it comprises a recess to enable the pinion to engage into the gear rack, and on it a pin-shaped extension is secured vertically relative to the steering shaft, the extension actuating a valve slide of a steering valve designed as a linear slide valve,
   a spring which presses the gear rack against the pinion simultaneously stabilizes the support of the sleeve in the steering gear housing, characterized by the following further features:
   two needle bearings between the sleeve and the steering gear housing are formed by two needles,
   the two needle bearings are designed on different sides of the gear rack,
   the bearing axis interconnecting the two needle bearings is farther away from the steering shaft center line than the point of force transmission between the pinion and the gear rack, and it is placed on the same side of the steering shaft center line as the latter point (both axes and the point lie in one plane), and the valve slide is biassed by a captivated spring.

2. A device as claimed in claim 1, characterized by the further feature of a pair of insert rings which are rigidly coupled to the steering gear housing and within which the needles are individually retained.

3. A device as claimed in claim 1, characterized by the further features of a spring and the sleeve having an annular extension which is retained by the spring in relation to each needle.

4. A device as claimed in claim 2, characterized in that the insert rings simultaneously serve as limiter (stops) for the rotary motion of the sleeve about the bearing axis.

5. A device as claimed in claim 1, characterized in that the extension is screwed into a threaded bore of the sleeve.

6. A device as claimed in claim 5, characterized in that the extension extends vertically relative to the gear rack.

7. A device as claimed in claim 6, characterized in that the end of the extension which is not coupled to the sleeve is furnished with a spherical head and engages into a recess of the valve slide.

8. A device as claimed in claim 1, characterized in that a housing of the steering valve is rigidly coupled to the steering gear housing.

9. A device for actuating a hydraulic power steering system for automotive vehicles characterized by the following features:
   a steering shaft non-rotatably coupled with a steering wheel is furnished with a pinion and is supported in a sleeve,
   the pinion is engaged with a gear rack coupled to wheels to be steered,
   the sleeve is supported in a steering gear housing so as to be pivotable about a parallel axis in relation to the steering shaft, and it comprises a recess to enable the pinion to engage into the gear rack, and on it a pin-shaped extension is secured vertically relative to the steering shaft, the extension governing the eccentricity of a pump which acts upon a double-effect hydraulic cylinder assisting the movement of the gear rack,
   a spring which presses the gear rack against the pinion simultaneously stabilizes the support of the sleeve in the steering gear housing,
   two needles form two bearings between the sleeve and the steering gear housing on different sides of the gear rack,
   the bearing axis interconnecting the two needle bearings is farther away from the steering shaft center line than the point of force transmission between the pinion and the gear rack, and it is placed on the same side of the steering shaft center line as the latter point, as well as in one plane with the two of them.

10. A device for actuating a power steering system for automotive vehicles characterized by the following features:
- a steering shaft non-rotatably coupled with a steering wheel is furnished with a pinion and is supported in a sleeve,
- the pinion is engaged with a gear rack coupled to wheels to be steered,
- the sleeve is supported in a steering gear housing so as to be pivotable about a parallel axis in relation to the steering shaft, and it comprises a recess to enable the pinion to engage into the gear rack, and on it a pin-shaped extension is secured vertically relative to the steering shaft, the extension actuating an electric switch, a sliding contact, a potentiometer or sensor for controlling the power-assisted steering system,
- a spring which presses the gear rack against the pinion simultaneously stabilizes the support of the sleeve in the steering gear housing,
- two needle bearings between the sleeve and the steering gear housing are formed by two needles,
- the two needle bearings are designed on different sides of the gear rack, and
- the bearing axis interconnecting the two needle bearings is farther away from the steering shaft center line than the point of force transmission between the pinion and the gear rack, and it is placed on the same side of the steering shaft center line as the latter point as well as in one plane with the two of them.

11. Apparatus for actuating a linear slide control valve of a hydraulic power steering system in response to rotation of a steering wheel of an automotive vehicle, aid apparatus comprising:
- a steering gear housing;
- a gear rack within said steering gear housing and adapted to be coupled to a pair of wheels of said automotive vehicle;
- a steering shaft adapted to be coupled to a steering wheel of said automotive vehicle and having a pinion engaging said gear rack and disposed perpendicular to said gear rack;
- a sleeve through which said steering shaft extends and within which said steering shaft can rotate relative to said sleeve;
- first and second bearing means for mounting said sleeve in said steering gear housing for pivotal movement of said sleeve relative to said steering gear housing, each of said bearing means including:
  (a) a needle pin mounted to said steering gear housing, and
  (b) a needle bearing mounted to said sleeve and engaged by one of said needle pins;
- said first and said second bearing means located:
  (a) on opposite sides of said gear rack and having a common axis which extends parallel to said steering shaft, and
  (b) on the same side of said steering shaft as the engagement of said pinion and said gear rack and radially outward of the engagement of said pinion and said gear rack;
- a linear slide control valve having an inlet means adapted for connection to a source of pressure fluid for receiving pressure fluid and outlet means adapted for connection to a power drive for dispensing pressure fluid;
- and valve control means extending between said sleeve and said linear slide control valve for controlling said linear slide control valve in response to pivotal movement of said sleeve.

12. A power steering system according to claim 11 further including means for urging said gear rack and said pinion into engagement.

13. A power steering system according to claim 12 wherein said linear slide control valve includes a valve slide movable along a line extending parallel to the movement of said gear rack and said valve control means include a member fixed to said sleeve and extending perpendicular to said steering shaft.

14. A power steering system according to claim 13 wherein said steering gear housing includes first and second insert rings at opposite ends of said steering gear housing and said needle pins are mounted in said insert rings.

15. A power steering system according to claim 14 wherein said needle bearings are formed in extensions at opposite ends of said sleeve.

16. A power steering system according to claim 14 wherein said insert rings have stops which define the extent to pivotal movement of said sleeve.

17. A power steering system according to claim 13 wherein said sleeve has a tapped bore and said valve control member has a threaded end which is turned into said tapped bore.

18. A power steering system according to claim 17 wherein said valve control member extends perpendicular to said gear rack.

19. A power steering system according to claim 18 wherein said valve slide has a recess and said valve control member has a spherical head at an end opposite said threaded end which is received by said recess in said valve slide.

20. A power steering system according to claim 19 wherein said linear slide control valve has a housing which is attached to said steering gear housing.

21. A power steering system according to claim 11 wherein said common axis and the engagement of said pinion and said gear rack both are in one plane.

22. A power steering system according to claim 11 wherein said common axis, the engagement of said pinion and said gear rack, and the axis of said steering shaft all are in one plane.

23. Apparatus for governing the eccentricity of a pump which controls a double-acting cylinder of a hydraulic power steering system in response to rotation of a steering wheel of an automotive vehicle, said apparatus comprising:
- a steering gear housing;
- a gear rack within said steering gear housing and adapted to be coupled to a pair of wheels of said automotive vehicle;
- a steering shaft adapted to be coupled to a steering wheel of said automotive vehicle and having a pinion disposed perpendicular to said gear rack and engaging said gear rack for moving said gear rack in response to rotation of said steering shaft;
- a sleeve through which said steering shaft extends and within which said steering shaft can rotate relative to said sleeve;
- first and second bearing means for mounting said sleeve in said steering gear housing for pivotal movement of said sleeve relative to said steering gear housing, each of said bearing means including:

(a) a needle pin mounted to said steering gear housing, and
(b) a needle bearing mounted to said sleeve and engaged by one of said needle pins;

said first and said second bearing means located:
(a) on opposite sides of said gear rack and having a common axis which extends parallel to said steering shaft, and
(b) on the same side of said steering shaft as the engagement of said pinion and said gear rack and radially outward of the engagement of said pinion and said gear rack;

a double-acting cylinder coupled to said gear rack for assisting movement of said gear rack in response to rotation of said steering shaft;

a pump adapted for connection to a source of pressure fluid for dispensing pressure fluid to drive said double-acting cylinder;

and means extending between said sleeve and said pump for governing the eccentricity of said pump in response to pivotal movement of said sleeve.

24. Apparatus for controlling the power drive of a hydraulic power steering system in response to rotation of a steering wheel of an automotive vehicle, said apparatus comprising:

a steering gear housing;

a gear rack within said steering gear housing and adapted to be coupled to a pair of wheels of said automotive vehicle;

a steering shaft adapted to be coupled to a steering wheel of said automotive vehicle and having a pinion disposed perpendicular to said gear rack and engaging said gear rack for moving said gear rack in response to rotation of said steering shaft;

a sleeve through which said steering shaft extends and within which said steering shaft can rotate relative to said sleeve;

first and second bearing means for mounting said sleeve in said steering gear housing for pivotal movement of said sleeve relative to said steering gear housing, each of said bearing means including:
(a) a needle pin mounted to said steering gear housing, and
(b) a needle bearing mounted to said sleeve and engaged by one of said needle pins;

said first and said second bearing means located:
(a) on opposite sides of said gear rack and having a common axis which extends parallel to said steering shaft, and
(b) on the same side of said steering shaft as the engagement of said pinion and said gear rack and radially outward of the engagement of said pinion and said gear rack;

drive means coupled to said gear rack for assisting movement of said gear rack in response to rotation of said steering shaft;

a pump adapted for connection to a source of pressure fluid for dispensing pressure fluid to said drive means;

control means for controlling operation of said pump;

and means extending between said sleeve and said control means for actuating said control means to control operation of said pump in response to pivotal movement of said sleeve.

* * * * *